(12) United States Patent
Packer

(10) Patent No.: US 6,816,915 B1
(45) Date of Patent: Nov. 9, 2004

(54) I/O SUBSYSTEM TOPOLOGY DISCOVERY METHOD

(75) Inventor: John S. Packer, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 731 days.

(21) Appl. No.: 09/798,100

(22) Filed: Mar. 2, 2001

(51) Int. Cl.[7] .................................................. G06F 3/00
(52) U.S. Cl. .............................. 710/2; 710/62; 710/74; 710/300
(58) Field of Search .......................... 710/2, 3, 62, 74, 710/300

(56) References Cited

U.S. PATENT DOCUMENTS

| | | | | |
|---|---|---|---|---|
| 5,239,632 A | * | 8/1993 | Larner | 710/314 |
| 5,596,727 A | * | 1/1997 | Literati et al. | 710/300 |
| 5,745,493 A | | 4/1998 | St. Clair | 370/438 |
| 5,815,074 A | | 9/1998 | Sasagawa et al. | 340/505 |
| 5,925,120 A | | 7/1999 | Arp et al. | 710/131 |
| 6,115,772 A | | 9/2000 | Crater | 710/129 |
| 6,493,785 B1 | | 12/2002 | Galloway | 710/314 |
| 6,510,481 B1 | | 1/2003 | Petty | 710/305 |
| 6,546,497 B1 | | 4/2003 | Galloway et al. | 713/501 |
| 6,557,064 B1 | | 4/2003 | Galloway | 710/260 |
| 6,636,921 B1 | * | 10/2003 | Scholhamer et al. | 710/305 |

* cited by examiner

Primary Examiner—Jeffrey Gaffin
Assistant Examiner—Alan Chen
(74) Attorney, Agent, or Firm—Martine & Penilla, LLP

(57) ABSTRACT

The present invention provides methods for automatically discovering topology map of an I/O subsystem. The I/O subsystem is coupled to one or more host computers and includes one or more peripheral buses, a set of peripheral devices, and a set of expanders with each expander having a valid expander address and being arranged to couple a pair of the peripheral buses. The peripheral devices and the one or more host computers are coupled to the peripheral buses. A host computer selects a peripheral device as a target device and writes a set of entries to the selected target device. Each entry written an expander address field initialized to an invalid expander address for storing an expander address. The host computer then selects the target device and reads the set of entries from the target device. For each expander coupled between the host computer and the target device, the valid expander address associated with the each expander is assigned to one of the expander address fields in the set of entries that contain invalid expander addresses. The host computer receives the set of entries such that the set of the valid expander addresses in the set of entries indicates identity of associated expanders coupled between the host computer and the target device. These operation are repeated for each of the other peripheral devices as the target device so as to discover the topology map of the entire I/O subsystem.

24 Claims, 12 Drawing Sheets

Entry 1

| WORD 0: | XID: FFh | XSIG ID: 00h | 802 |
|---|---|---|---|
| WORD 1: | 00h | 00h | |
| WORD 2: | 00h | 00h | |
| WORD 3: | 00h | 00h | |
| WORD 4: | 00h | 00h | 804 |
| WORD 5: | 00h | 00h | |
| WORD 6: | 00h | 00h | |
| WORD 7: | 00h | 00h | |

Entry 2

| WORD 0: | XID: FFh | XSIG ID: 00h | 802 |
|---|---|---|---|
| WORD 1: | 00h | 00h | |
| WORD 2: | 00h | 00h | |
| WORD 3: | 00h | 00h | |
| WORD 4: | 00h | 00h | 804 |
| WORD 5: | 00h | 00h | |
| WORD 6: | 00h | 00h | |
| WORD 7: | 00h | 00h | |

•
•
•

Entry N

| WORD 0: | XID: FFh | XSIG ID: 00h | 802 |
|---|---|---|---|
| WORD 1: | 00h | 00h | |
| WORD 2: | 00h | 00h | |
| WORD 3: | 00h | 00h | |
| WORD 4: | 00h | 00h | 804 |
| WORD 5: | 00h | 00h | |
| WORD 6: | 00h | 00h | |
| WORD 7: | 00h | 00h | |

FIG. 8A

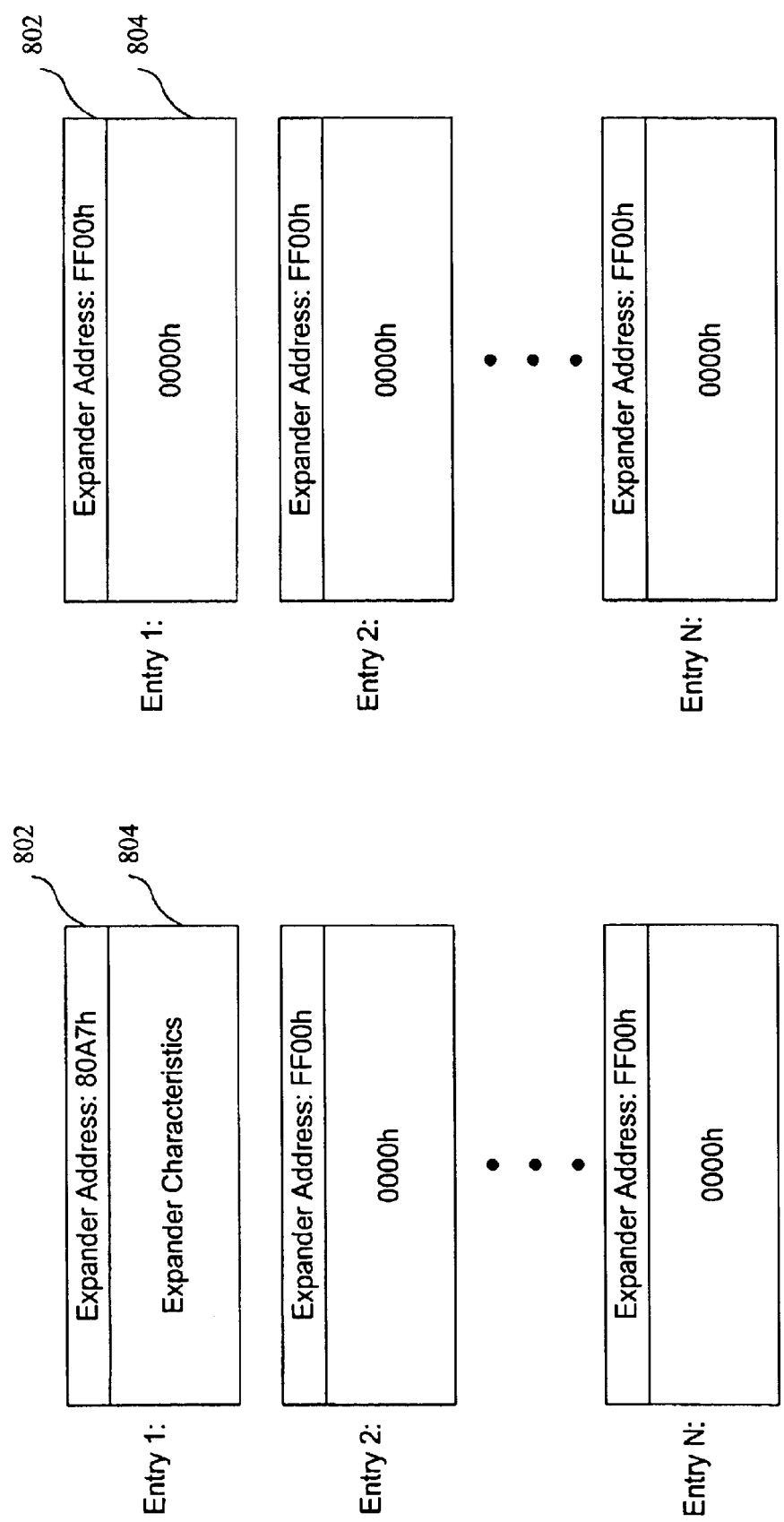

Entry 1:
| Expander Address: 81A7h |
| Expander Characteristics |

Entry 2:
| Expander Address: 82A7h |
| Expander Characteristics |

Entry 3:
| Expander Address: 83A7h |
| Expander Characteristics |

Entry 4:
| Expander Address: FF00h |
| 0000h |

●
●
●

Entry N:
| Expander Address: FF00h |
| 0000h |

FIG. 8C

I/O SUBSYSTEM TOPOLOGY DISCOVERY METHOD

CROSS REFERENCE TO RELATED APPLICATIONS

This application is related to U.S. patent application Ser. No. 09/798,278 entitled "Methods for Assigning Addresses to Expanded Devices in I/O Subsystem" by Charles A. Monia et al. This application is also related to U.S. patent application Ser. No. 09/798,275 entitled "Automatic Addressing of Expanders in I/O Subsystem" by John S. Packer. These applications, filed on the same day as the present application, are incorporated herein by reference.

BACKGROUND OF THE INVENTION

1. Field of the Invention

This invention relates generally to computer I/O subsystems having expanders, and more particularly to methods for discovering topology of I/O subsystems including peripheral devices and expanders.

2. Description of the Related Art

Modem computer systems often utilize one or more buses to connect to peripheral devices to enhance its resources. For example, the resources of a computer system may be substantially increased by connecting the computer system to one or more peripheral devices such as disk drives, tape drives, printers, scanners, optical drives, and the like. These peripheral devices are attached to the computer system by means of a peripheral bus (e.g., cable).

One of the most widely used peripheral buses is the well known small computer systems interface (SCSI) bus, which is defined in conformity with well known SCSI protocols (e.g., SCSI-1, SCSI-2, SCSI-3, etc.), which are incorporated herein by reference. The SCSI protocols are designed to provide an efficient peer-to-peer I/O interface between a host computer and its peripheral devices in a computer system.

FIG. 1 shows a block diagram of a conventional computer system 100 including a host computer 102, a plurality of SCSI devices 106, and a SCSI bus 108. The host computer 102 includes a SCSI host adapter 104 for communicating with the SCSI devices 106. The host adapter 104 in the computer system 100 controls communication between the host computer 102 and the SCSI devices 106. For example, the host adapter 104 provides a physical connection between the host computer 102 and the SCSI bus 108. In addition, it is configured to receive data, address, and control signals from the host computer 102 and convert the signals into corresponding SCSI compatible data, address, and control signals. Conversely, the SCSI host adapter 104 is also configured to receive SCSI compatible data, address, and control signals from the SCSI devices 106 through the SCSI bus 108 and convert them into corresponding host-bus compatible data, addressing, and control signals. The SCSI host adapter 104 is well known in the art and may be implemented, for example, by using AIC-7890A™ packaged semiconductor device, which is available from Adaptec Inc., of Milpitas, Calif.

Under the conventional SCSI specifications, the SCSI bus 108 may connect up to 16 SCSI devices including the host adapter 104 depending on the type of SCSI bus implemented. The SCSI devices 106 may be peripheral devices such as disk drives, tape drives, printers, scanners, optical drives, or any other devices that meet the SCSI specification. The SCSI bus 108 is typically implemented as a cable having a set of parallel wires. For example, the SCSI-1 cable has 50 wires. Of these 50 wires, eight wires are for data, one wire is for parity, nine wires are for control, 25 wires are for ground, and the remaining wires are for power or are reserved for future use. The eight data wires are used to carry eight bits of data in parallel. In general, conventional SCSI bus cables include either 8 or 16 data wires for carrying 8 or 16 bits, respectively, of data in parallel. The data wires in the bus thus define a datapath for communicating bits equal to the number of data wires in the bus.

A traditional SCSI bus may accommodate a plurality of SCSI devices up to a maximum number equal to the number of data bits in the SCSI bus. In practice, the width of the SCSI datapath is typically 8 or 16 bits corresponding to the number of data wires in the SCSI bus. This means the maximum number of SCSI devices, including a host adapter, that can be attached to a SCSI bus is limited to 8 or 16.

Conventional SCSI buses, however, are generally capable of transmitting signals reliably for a specified cable length only. For example, SCSI bus cables conforming to SCSI specifications are typically limited to a maximum length such as 3, 6, 12, or 25 meters, and the like. In modern computer systems such as servers that need to communicate with numerous SCSI devices, some SCSI peripheral devices may be located more than the specified cable length away from a host computer.

In such instances, an expander, which is essentially a repeater, is typically used to add another SCSI bus, which is then used to couple additional SCSI devices. FIG. 2 illustrates a conventional computer system 200 that includes an expander 214 for connecting a pair of SCSI buses 208 and 210. In the computer system 200, a host computer 202 is coupled to the SCSI bus 208 via a SCSI host adapter 204. One or more SCSI devices 206 are coupled to the SCSI bus 208 while one or more SCSI devices 212 are coupled to the SCSI bus 210. The expander 214 is coupled between the SCSI buses 208 and 210 to regenerate signals received on either SCSI bus 208 or 210 for transmission to the other SCSI bus. In this configuration, the expander 214 functions to extend the length of the overall SCSI bus so that additional SCSI devices 212 or expanders can be attached to the SCSI bus 210. The SCSI devices 212 and SCSI bus 210 are collectively referred to as a segment. Similarly, the host adapter 204, SCSI devices 208, and SCSI bus 210 collectively define another segment.

Conventional expanders, however, are typically transparent devices without SCSI IDs of their own. This means that the expanders are not addressable and are thus invisible to SCSI protocol. Using such transparent expanders without dedicated SCSI IDs in an I/O subsystem presents several drawbacks. For example, individual segments of the I/O subsystem often need to be modified to isolate faulty cables, connections, drivers, and receivers. In addition, it is often desirable to communicate with individual expanders to determine optimum speed at which the expanders can communicate during domain validation.

Because conventional expanders are not addressable, these modifications and domain validation processes may not be easily performed automatically without a system administrator. In addition, a host computer typically needs to know the topology or map of the entire I/O subsystem before performing the modifications and domain validation processes. One obvious solution would be to implement expanders like SCSI devices by adding SCSI controllers and assigning SCSI IDs used for SCSI devices. This solution, however, would reduce the number of addressable SCSI devices that can be attached to a SCSI I/O subsystem. Further, assigning SCSI addresses to expanders will typically require system administrators to keep track of SCSI IDs of all individual expanders and manually set the jumpers for the expander IDs. In a complex I/O subsystem with substantial number of SCSI devices and expanders, assigning SCSI IDs to expanders by manually setting the jumpers may be complicated and labor intensive.

In view of the foregoing, what is needed is a method for automatically discovering topology map of I/O subsystems that use expanders to extend the length of a SCSI bus without using valuable conventional SCSI IDs.

SUMMARY OF THE INVENTION

The present invention fills these needs by providing methods for discovering topology map of an I/O subsystem. It should be appreciated that the present invention can be implemented in numerous ways, including as a process, an apparatus, a system, a device, a method, or a computer readable medium. Several inventive embodiments of the present invention are described below.

In one embodiment, the present invention provides a method for automatically discovering topology map of an I/O subsystem. The I/O subsystem is coupled to one or more host computers and includes one or more peripheral buses, a set of peripheral devices, and a set of expanders with each expander having a valid expander address and being arranged to couple a pair of the peripheral buses. The peripheral devices and the one or more host computers are coupled to the peripheral buses. A host computer selects a peripheral device as a target device and writes a set of entries to the selected target device. Each entry written contains an expander address field initialized to an invalid expander address for storing an expander address. The host computer then selects the target device and reads the set of entries from the target device. For each expander coupled between the host computer and the target device, the valid expander address associated with the each expander is written to or replaced by one of the expander address fields in the set of entries that contain invalid expander addresses. The host computer receives the set of entries such that the set of the valid expander addresses in the set of entries indicates identity of associated expanders coupled between the host computer and the target device. These operations are repeated for each of the other peripheral devices as the target device so as to discover the topology map of the entire I/O subsystem.

In another embodiment, the present invention provides a method for automatically discovering topology map of a SCSI I/O subsystem. The SCSI I/O subsystem is coupled to one or more host computers and includes one or more SCSI buses, a set of SCSI devices, and a set of expanders with each expander having a valid expander address and being arranged to couple a pair of the SCSI buses. The SCSI devices and the one or more host computers are coupled to the SCSI buses. In this method, a host computer selects a SCSI device as a target device and writes a set of entries to the selected target device. Each entry has an expander address field that is initialized to an invalid expander address for storing an expander address. Then, the host computer selects the target device and reads the set of entries from the target device. For each expander coupled between the host computer and the target device, the expander addresses in each of the entries is read and the valid expander address associated with the each expander is written into one of the expander address fields in the set of entries that contain invalid expander addresses. The host computer receives the set of entries that contain a set of the valid expander addresses. The received set of the valid expander addresses in the set of entries indicates identity of associated expanders coupled between the host computer and the target device. These operations are repeated for each of the other SCSI devices as the target device such that the sets of entries specify the topology map of the I/O subsystem.

Advantageously, the methods of the present invention allow topology mapping of I/O subsystems that use expanders to allow an in-line peripheral bus to run for greater lengths with branches. The I/O topology mapping is useful, for example, in domain validation, where expanders are addressed to determine their capabilities. In addition, the expander addressing scheme of the present invention allows significant flexibility in adding expanders without using conventional one-bit SCSI device IDs. Accordingly, the number of addressable legacy SCSI devices that can be attached to an I/O subsystem is not reduced by the use of expanders. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 8A shows a schematic diagram of an exemplary set of N expander entries from Entry 1 to Entry N in accordance with one embodiment of the present invention.

FIGS. 8B to 8G illustrate topology maps for SCSI peripheral devices in the I/O subsystem of FIG. 4.

DETAILED DESCRIPTION OF THE PREFERRED EMBODIMENTS

The present invention provides methods for method for discovering topology map of an I/O subsystem. It will be obvious, however, to one skilled in the art, that the present invention may be practiced without some or all of these specific details. In other instances, well known process operations have not been described in detail in order not to unnecessarily obscure the present invention.

Figure 1:
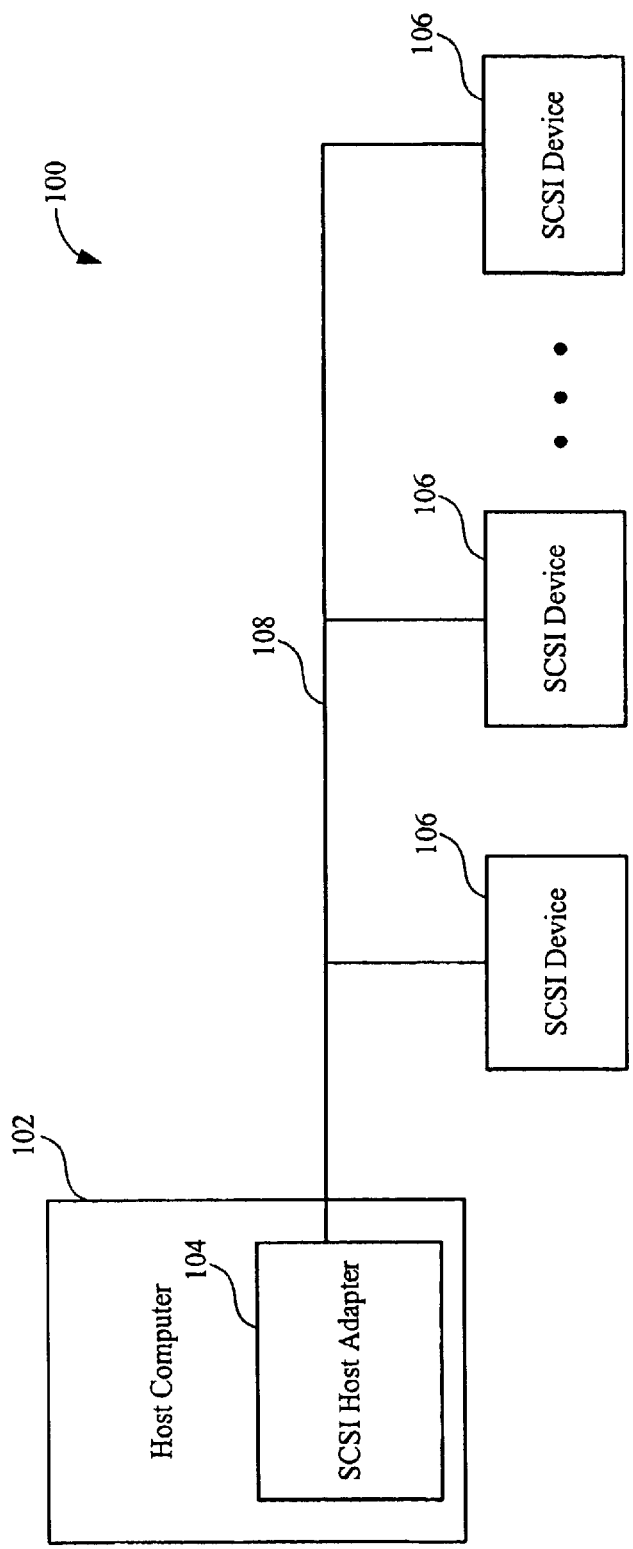
FIG. 1 shows a block diagram of a conventional computer system including a host computer, a plurality of SCSI devices, and a SCSI bus.
Figure 2:
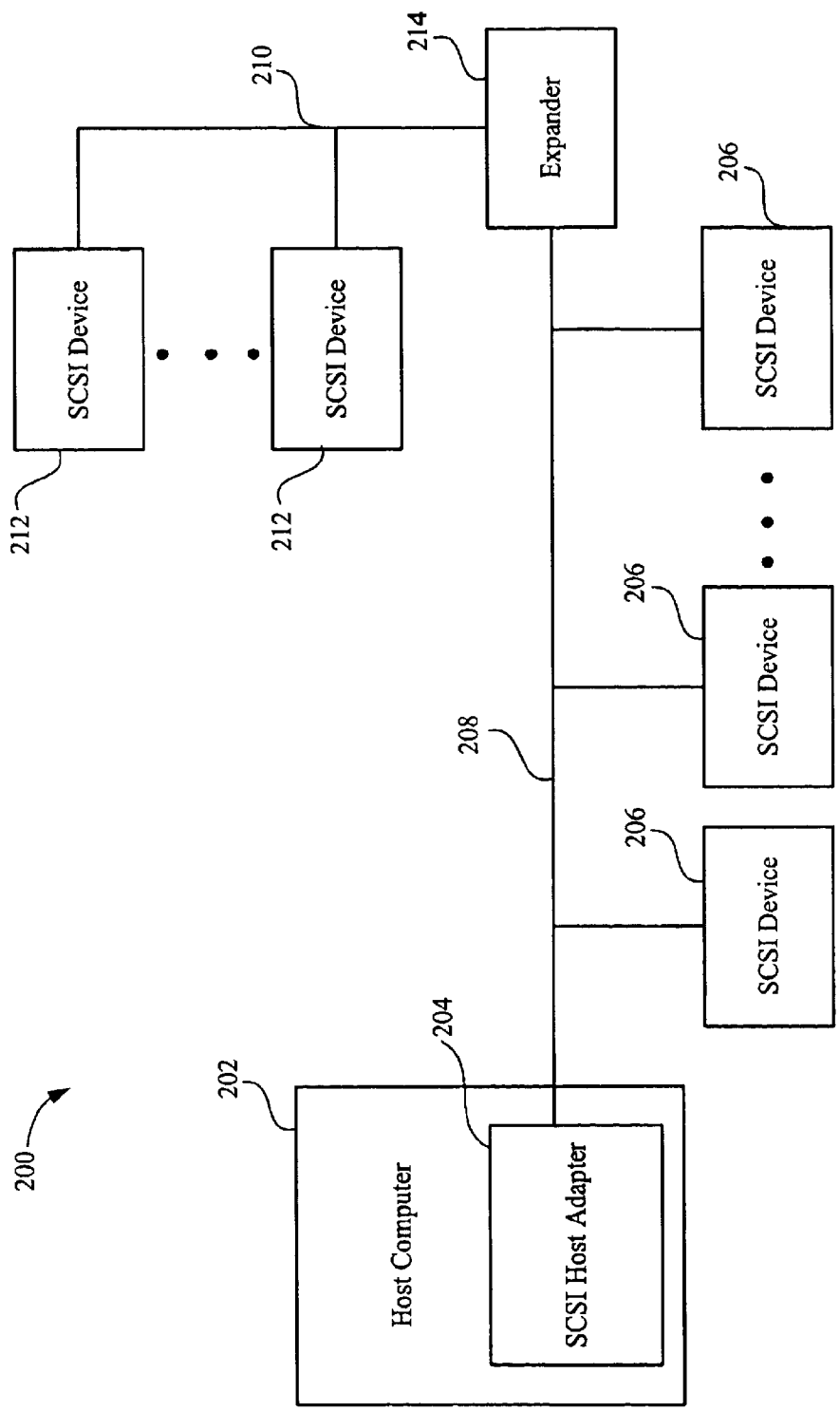
FIG. 2 illustrates a conventional computer system that includes an expander for connecting a pair of SCSI buses.
Figure 3A:
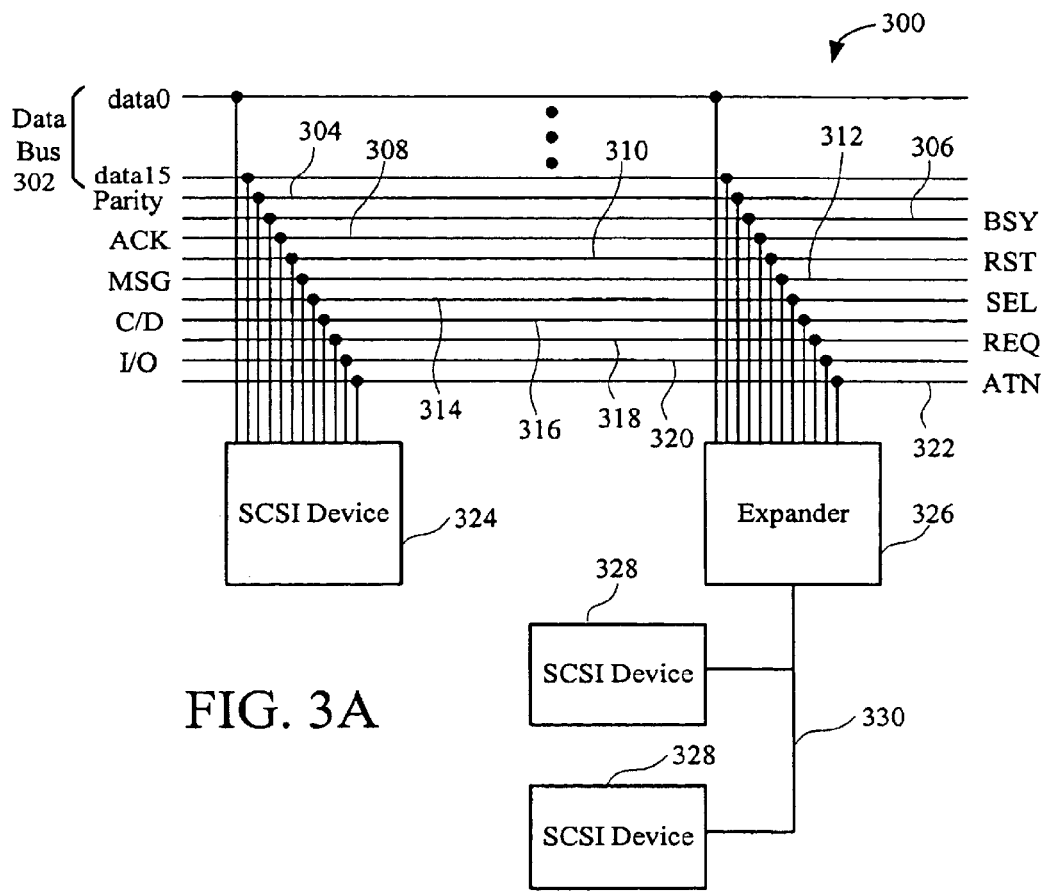
FIG. 3A illustrates a schematic diagram of an exemplary SCSI bus that is used to connect one or more SCSI devices and one or more expanders in accordance with one embodiment of the present invention.

FIG. 3A illustrates a schematic diagram of an exemplary SCSI bus 300 for coupling one or more SCSI devices 324 and one or more expanders 326 in accordance with one embodiment of the present invention. The expander 326, coupled between SCSI buses 300 and 330, effectively extends the length of the SCSI bus 300 by allowing one or more SCSI devices 328 to be attached to the SCSI bus 330. The SCSI bus 300 includes a set of electrical lines (e.g., wires) for carrying data and control signals. In this illustrated embodiment, a set of data lines 302 comprising data0 to data15 defines a datapath used for carrying data. A parity line 304 is provided in the bus 300 for transmitting a parity bit. In addition, a set of control lines 306, 308, 310, 312, 314, 316, 318, 320, and 322 is used to carry well known SCSI control signals BSY (busy), ACK (acknowledge), RST (reset), MSG (message), SEL (select), C/D (control/data), REQ (request), I/O (input/output), and ATN (attention), respectively. Table 1 shows these control signals and their functions.

TABLE 1

| SIGNAL | FUNCTION |
| --- | --- |
| BSY | Indicates whether the bus is currently busy. |
| SEL | Asserted by an initiator or target to select target or initiator, respectively. |
| C/D | Indicates whether control data is placed on the bus. |
| I/O | Indicates direction of data flow on the data bus relative to the initiator. |
| MSG | Activated by a target during a message phase. |
| REQ | Indicates data transfer handshake request by a target. |
| ACK | Indicates data transfer handshake acknowledge by an initiator. |
| ATN | Activated by an initiator to indicate an attention condition. |
| RST | Used to reset all connected SCSI devices. |

Although the SCSI bus 300 is illustrated with 16-bit data bus of 16-bit datapath, it may also be implemented using any N-bit data bus where N is an even number multiple of 2 such as 8, 16, 32, etc. In addition, it is noted that the present invention may be implemented using any SCSI protocols such as SCSI-1, SCSI-2, SCSI-3, and the like.

In conventional SCSI buses, a SCSI device address (i.e., ID) is a value corresponding to one of the bit positions on the data bus. Allowable device addresses on conventional SCSI buses may range from 0 to 7 on an eight-bit bus and 0 through 15 on a wide (16-bit) bus. In a SCSI I/O subsystem with 16-bit SCSI data bus, for example, a host adapter may have a SCSI ID of "15" corresponding to data bus line (e.g., data15) while other SCSI devices may have a SCSI ID ranging from "0" to "14" (e.g., data0 to data 14). The SCSI IDs asserted on a SCSI bus serve to determine device priority during arbitration and to establish communications with another device during selection or reselection. SCSI protocols specifying the priority of SCSI IDs are well known to those skilled in the art. For example, the priority of SCSI IDs ranging from 0 to 15, in the order of highest to lowest priority, may be 7, 6, 5, 4, 3, 2, 1, 0, 15, 14, 13, 12, 11, 10, 9, and 8.

During a SCSI arbitration phase, a SCSI device contends for the SCSI bus by asserting a data bit line corresponding to its SCSI ID. When several devices are arbitrating for the bus, relative bit positions of the contending devices are used to determine which device wins the arbitration. That is, the contending device with the highest priority SCSI ID wins the arbitration. Upon winning arbitration, the winning device asserts, as an initiator, the SCSI ID of a target device on the data bus. Thus, at this time, the SCSI IDs of both the initiator and target are asserted. This, in turn, means that only two data bus lines corresponding to the SCSI IDs of the initiator and target are asserted on the SCSI bus. The target device corresponding to the asserted SCSI ID of the target then responds by asserting a SEL signal on the SCSI bus and gains control of the bus for communication with the initiator.

In the conventional SCSI protocols, the selection or reselection of a target device requires assertion of only two data bus lines corresponding to the SCSI IDs of the initiator and the target device. If more than two data bus lines are asserted, the target device does not respond to the initiator's selection or reselection attempt because it will not recognize the assertion of more than two data bus lines as valid selection or reselection protocol.

In a preferred embodiment, the topology discover methods of the present invention employs an expander ID and an expander signature to assign IDs to expanders to allow addressing of the expanders without using conventional SCSI IDs.

Specifically, given that a SCSI bus has an N-bit datapath corresponding to N data lines in the SCSI bus, the present invention defines the expanded address space for addressing expanders and/or other devices by partitioning the N data bits in the datapath of the SCSI bus into two components: an expanded ID (XID) field and an expanded signature (XSIG) field. Preferably, the datapath is partitioned equally so that the expanded ID field and the expanded signature field are N/2 bits each. In addition, an address for an expander or other device is comprised of more than two bits asserted on the data lines of the SCSI bus so that conventional SCSI devices do not respond when an expander is being selected.

Figure 3B:
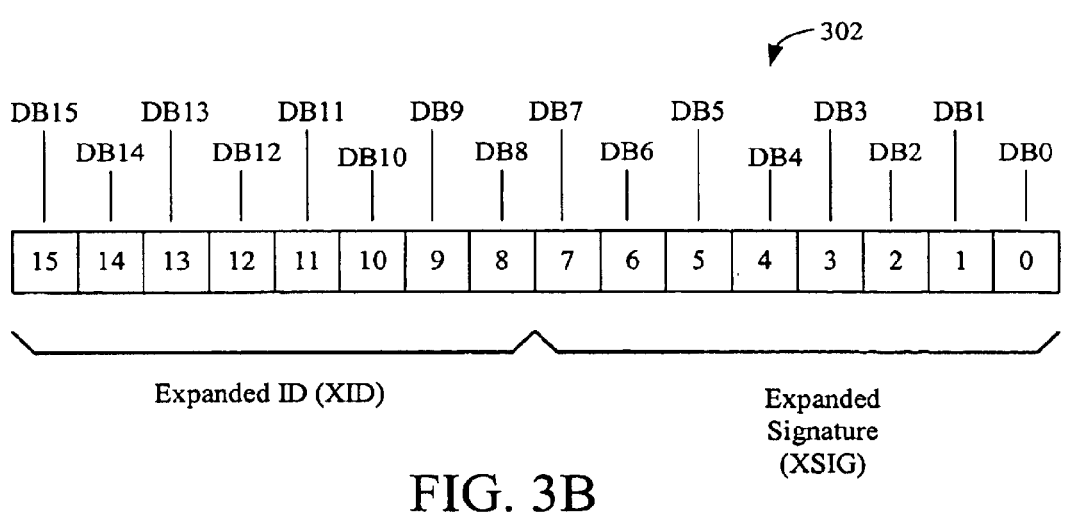
FIG. 3B shows a schematic diagram of a 16-bit datapath of the SCSI data bus partitioned to provide expanded addressing capability in accordance with one embodiment of the present invention.

FIG. 3B shows a schematic diagram of the 16-bit datapath of the SCSI data bus 302 partitioned to provide expanded addressing capability in accordance with one embodiment of the present invention. The partitioning of the datapath involves dividing the 16 bits (i.e., bit 0 to bit 15 or DB0 to DB15) into an 8-bit expanded ID field (XID) and an 8-bit expanded signature field (XSIG). The 8-bit expanded ID is thus defined by the bits DB8 to DB15 while the 8-bit expanded signature corresponds to the bits DB0 to DB7. In this scheme, the lower 8-bit expanded signature is used to identify a device as an expander while the higher 8-bit expanded ID is used to uniquely identify individual expanders. In addition to identifying expanders, the expanded signature field may also be used to identify difference types or categories of SCSI devices such as expanders, enclosure chips, terminators, etc. In such instances, different expanded signatures may be assigned to expanders, enclosure chips, and terminators.

The addressing of expanders is performed by extending conventional SCSI addressing during selection phase based on the fact that a legacy SCSI target device of a selection will only respond to a certain set of ID bits asserted on a SCSI data bus. That is, standard SCSI devices respond only when two bits corresponding to the IDs of the initiator and their own ID are asserted on the SCSI data bus.

To assign SCSI IDs to expanders without using conventional SCSI IDs, each SCSI ID (e.g., address) of the expanders is configured to have more than two bits asserted on the SCSI data bus. This ensures that conventional SCSI devices do not respond when selecting expanders. In one embodiment, SCSI expanders are configured to respond to a selection with five or more bits asserted. For example, five bits may be asserted in expanded signature field and one to seven bits may be asserted in the expander ID field. The five bits in the expanded signature field ensure that neither standard nor extended address SCSI devices will consider the SCSI expander selection address as being valid. Extended addressing of SCSI devices is described in U.S. patent application Ser. No. 09/636,038, entitled "Methods for Addressing Extended Number of Peripheral Devices over Peripheral Bus," by Charles A. Monia et al. and is incorporated herein by reference.

The expanded signature is assigned a pattern that will not be mistaken by a legacy device. In one embodiment, the expanded signature pattern is configured to have at least three bits asserted to prevent a legacy SCSI device from recognizing the selection IDs as being valid. More preferably, the expanded signature pattern includes at least five asserted bits to operate properly with extended addressing of SCSI devices described above. Table 2 shows an exemplary set of possible 8-bit expanded signatures in hexadecimal numbers that can be assigned to expanders for a 16-bit SCSI data bus in accordance with one embodiment of the present invention. The 8-bit expanded signatures in Table 2 are organized according to the number of bits asserted (x,y) in the two 4-bit blocks making up the 8-bit number.

TABLE 2

| Expanded Signature (1, 4) | Expanded Signature (2, 3) | Expanded Signature (3, 2) | Expanded Signature (4, 1) |
|---|---|---|---|
| 1Fh | 37h | 73h | F1h |
| 2Fh | 3Bh | 75h | F2h |
| 4Fh | 3Dh | 76h | F4h |
| 8Fh | 3Eh | 79h | F8h |
| | 57h | 7Ah | |
| | 5Bh | 7Ch | |
| | 5Dh | B3h | |
| | 5Eh | B5h | |
| | 67h | B6h | |
| | 6Bh | B9h | |
| | 6Dh | BAh | |
| | 6Eh | BCh | |
| | 97h | D3h | |
| | 9Bh | D5h | |
| | 9Dh | D6h | |
| | 9Eh | D9h | |
| | A7h | DAh | |
| | ABh | DCh | |
| | ADh | E3h | |
| | AEh | E5h | |
| | C7h | E6h | |
| | CBh | E9h | |
| | CDh | EAh | |
| | CEh | ECh | |

In the 16-bit SCSI bus datapath, the expanded ID in the expanded ID field is a binary number from 00h through FFh. Each of the expanders is assigned a unique expander ID to allow individual addressing of the expanders. Table 3 illustrates exemplary expanded IDs used with some of the expanded signatures in accordance with one embodiment of the present invention.

TABLE 3

| Expanded Signature ID | Expanded ID | Selection Description |
|---|---|---|
| 37h | FFh | Null |
| | A0h–FEh | Reserved |
| | 80h–9Fh | Select individual hardwired terminator 0–31 |
| | 00h–7Fh | Reserved for SCSI device addresses to allow hardware decode of target ID to determine normal versus expanded selection |
| 3Dh | FFh | Null |
| | A0h–FEh | Reserved |
| | 80h–9Fh | Select individual Enclosure Chip 0–31 |
| | 00h–7Fh | Reserved for SCSI device addresses to allow hardware decode of target ID to determine normal versus expanded selection |
| A7h | FFh | Null used for topology discovery and expander address phases |
| | FEh | Broadcast select start expander address phase (ignored by hardwired expanders) |
| | FDh | Broadcast select stop expander address phase (ignored by hardwired expanders) |
| | FCh | Broadcast select automatic addressable expanders (ignored by hardwired expanders) |
| | FBh | Broadcast select reset expander addresses (ignored by hardwired expanders) |
| | FAh | Broadcast select start topology phase |
| | A9h | Broadcast select stop topology phase |
| | F1h–F8h | Reserved for future broadcast select codes |
| | F0h | Broadcast expander reset (reset to default expander characteristics) |
| | C0h–EFh | Reserved |
| | A0h–BFh | Select individual hardwired expanders 0–31 |
| | 80h–9Fh | Select individual auto-addressable expanders 0–31 |

TABLE 3-continued

| Expanded Signature ID | Expanded ID | Selection Description |
|---|---|---|
| | 00h–7Fh | Reserved for SCSI device addresses to allow hardware decode of target ID register to determine normal versus expanded selection |

As shown in Table 3, three different expanded signatures, i.e., 37h, 3Dh, and A7h, are defined for addressing hardwired terminators, enclosure chips, and expanders, respectively. For each type of expanded signatures, up to 256 devices and/or functions are addressable. In expanded signature A7h, for example, expanded IDs from A0 to BFh allows addressing of up to 32 hardwired expanders 32 auto-addressable expanders, and multiple "functions" such as F0h for broadcast expander reset. It should be appreciated, however, that the present invention may be implemented using any suitable expanded signatures XSIG to select a chip type (e.g., expander, etc.) and expanded IDs to select a device and/or function with more than two bits asserted.

With continuing reference to Table 3, a broadcast selection, for which XID is between F0h and FFh, does not require any response from target expanders. All expanders continually monitor the SCSI bus for broadcast selections. The expanders decode XID and XSIG values -on the SCSI data bus to determine a selection type. The broadcast selection is valid for all SCSI expanders of the a signature type (XSIG) unless an expander does not support such function. For example, hardwired expanders ignore any broadcasts relative to automatic addressing.

A unique selection, for which XID is between 80h and EFh, on the other hand, requires a response from the target expander and a subsequent SCSI command. Hardwired and auto-addressable expanders are assigned within different address ranges to allow one method of mixing within the same SCSI I/O subsystem, although the two can share the same address range.

Figure 4:
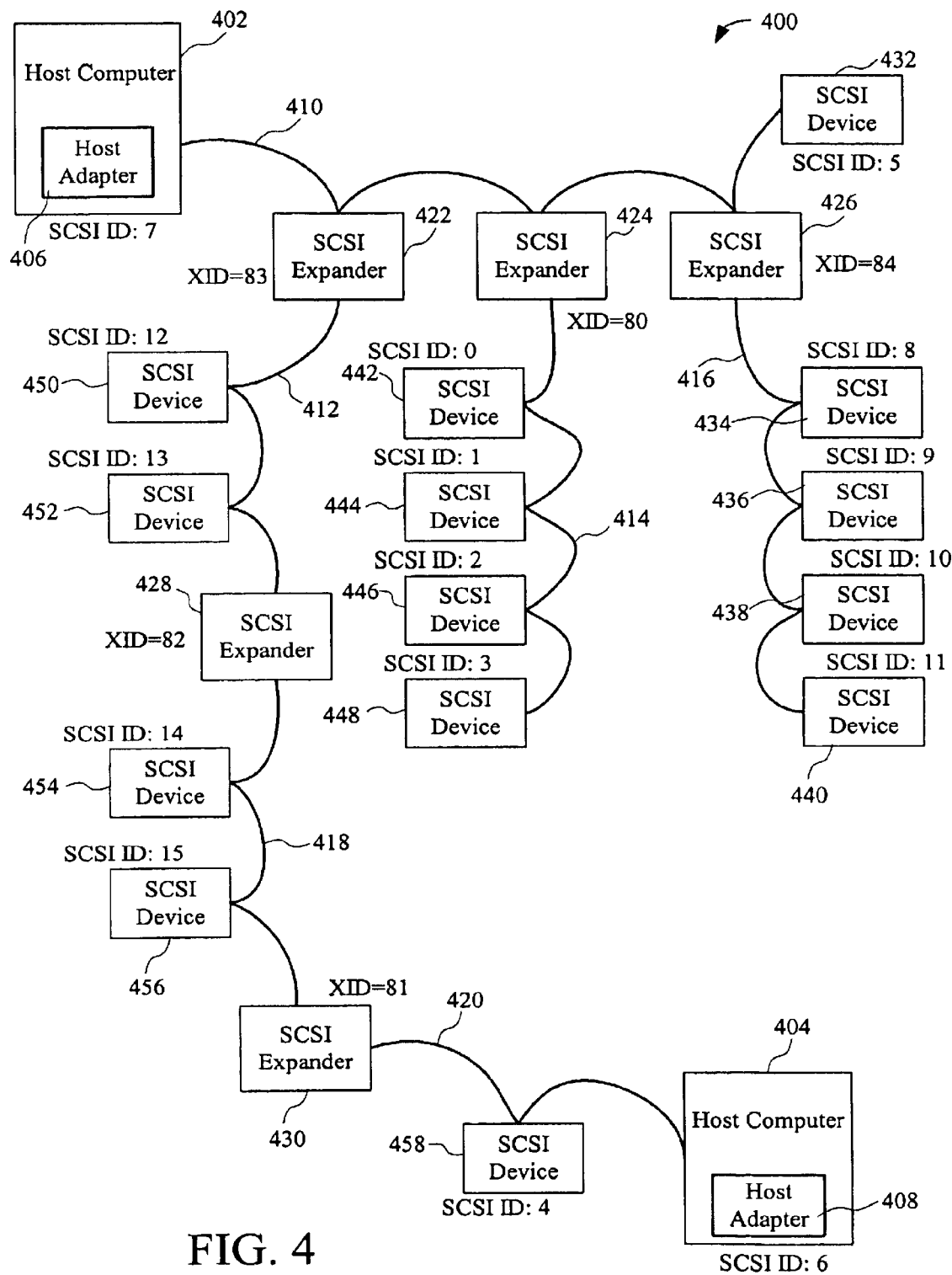
FIG. 4 shows a block diagram of an exemplary computer I/O subsystem implementing automatic expander addressing scheme in accordance with one embodiment of the present invention.

A SCSI I/O subsystem of the present invention may include SCSI host adapters, expanders, and peripheral target devices. FIG. 4 shows a block diagram of an exemplary I/O subsystem 400 implementing automatic expander addressing scheme in accordance with one embodiment of the present invention. A pair of host computers 402 and 404 includes SCSI host adapters 406 and 408, respectively, for communicating with SCSI devices in the I/O subsystem 400. The I/O subsystem 400 includes SCSI host adapters 406 and 408, a plurality of SCSI buses 410, 412, 414, 416, 418, and 420, a plurality of SCSI expanders 422, 424, 426, 428, and 430, and a plurality of SCSI devices 432, 434, 436, 438, 440, 442, 444, 446, 448, 450, 452, 454, 456, and 458. The SCSI devices 432 to 458 typically include a read/write buffer to accommodate read/write commands under SCSI protocol. It should be noted that the I/O subsystem 400 is exemplary only and may be implemented using any suitable number of SCSI expanders, SCSI devices, and host computers with host adapters.

On one side, the host adapter 406 couples the host computer 402 to expanders 422, 424, and 426, and SCSI device 432 via SCSI bus 410 in a daisy chain fashion. On the other side, the host adapter 408 couples the host computer 404 to expander 430 and SCSI device 458 via SCSI bus 420 in a daisy chain. The host adapters 406 and 408 function to interface and control communication between the respective host computers 402 and 404 and the I/O subsystem 400. Although the present invention is illustrated in conjunction with SCSI buses and devices, it may also be utilized in any suitable peripheral buses and bus devices. In addition, the I/O subsystem 400 may accommodate any suitable number of peripheral devices in accordance with the type of SCSI protocols.

The expanders 422, 424, 426, 428, and 430 are in-line devices that effectively extend the length of SCSI bus in the I/O subsystem 400 to run for greater distance than is allowed using a single SCSI bus. Specifically, the expander 422 is coupled to the SCSI bus 412, which is coupled to SCSI devices 450 and 452, and the expander 428 in a daisy chain. The expander 428, in turn, is coupled in a daisy chain to the SCSI bus 418, which is daisy chained to SCSI devices 454, 456, and expander 430. The expander 430 is further daisy chained to SCSI device 458 and host adapter 408 via SCSI bus 420. Similarly, the expander 424 is daisy chained to SCSI devices 442, 444, and 446, and 448 via SCSI bus 414. Likewise, the expander 426 is daisy chained to SCSI devices 434, 436, 438, and 440 via SCSI bus 416.

Figure 5:
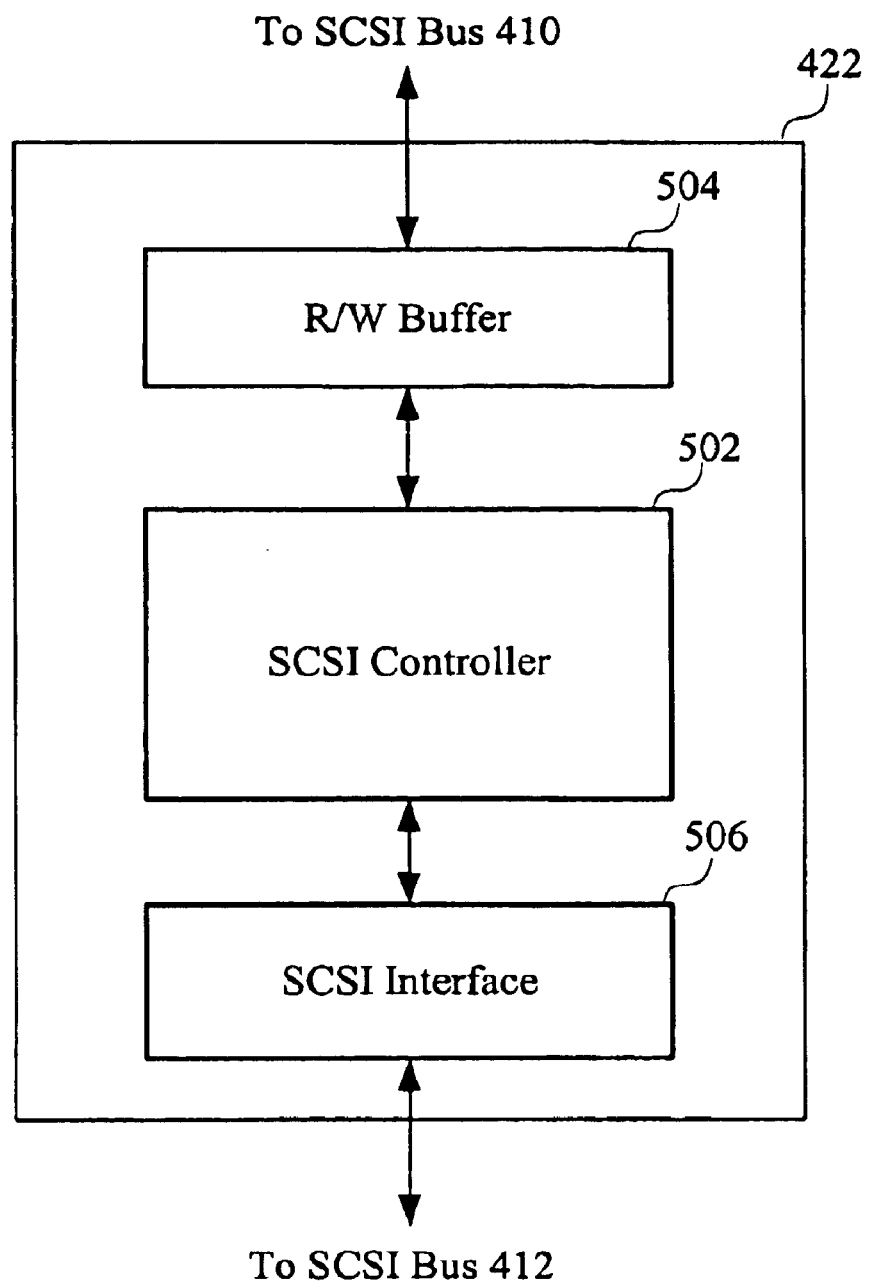
FIG. 5 shows a schematic block diagram of a SCSI expander in accordance with one embodiment of the present invention.

FIG. 5 shows a schematic block diagram of SCSI expander 422 in accordance with one embodiment of the present invention. The SCSI expander 422 is configured to interface and communicate data and control signals between SCSI buses 410 and 412. The SCSI expander 422 includes a SCSI controller 502 and a pair of SCSI interfaces 504 and 506. The SCSI interfaces 504 and 506 together function to receive and drive signals received from either SCSI bus 410 or 412 for transmission to the other SCSI bus. Other expanders 424, 426, 428, and 430 in the I/O subsystem 400 may be implemented in a similar manner.

Figure 6:
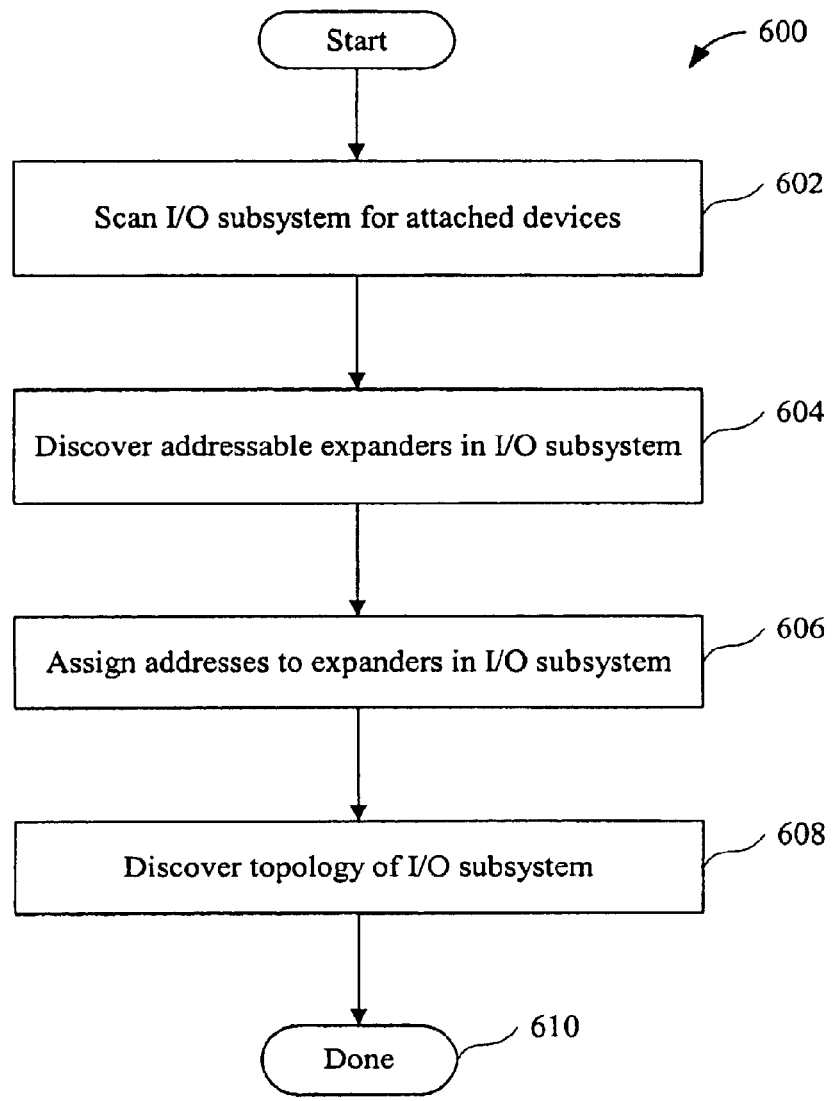
FIG. 6 shows a flowchart of a method for discovering the topology map of an I/O subsystem in accordance with one embodiment of the present invention.

FIG. 6 shows a flowchart of a method for discovering the topology map of an I/O subsystem in accordance with one embodiment of the present invention. Initially, the host computer discovers which devices are attached to the I/O Subsystem by scanning the I/O subsystem in operation 602. For example, if attached devices are capable of accepting selection as a target and support the conventional INQUIRY command, the host computer may issue an INQUIRY command to discover the SCSI IDs of the attached devices. The scanning of SCSI devices to determine the IDs of attached devices is well known in the art under conventional SCSI protocols.

After scanning the I/O subsystem, the host computer discovers addressable expanders in the I/O subsystem in operation 604 to determine if any auto-addressable expanders exist on the I/O subsystem. By way of example, the host computer selects all auto-addressable expanders via a broadcast selection. All powered-on and connected auto-addressable expanders then accept the selection drive BSY signal on the bus. When BSY signal is asserted, the host computer proceeds to operation 606 to assign addresses to expanders in the I/O subsystem. However, If all expanders are hardwired, the BSY signal is not asserted within a specified time and the hardwired address expanders will ignore the broadcast selection. In this case, the host computer proceeds directly to operation 608 for topology discovery. Methods for assigning addresses to addressable expanders are described, for example, in co-pending U.S. patent applications 09/798,278 and 09/798,275, which were previously incorporated by reference above. After assigning addresses to expanders, the method proceeds to operation 608 to discover the topology of the I/O subsystem. The method then terminates in operation 610.

Figure 7:
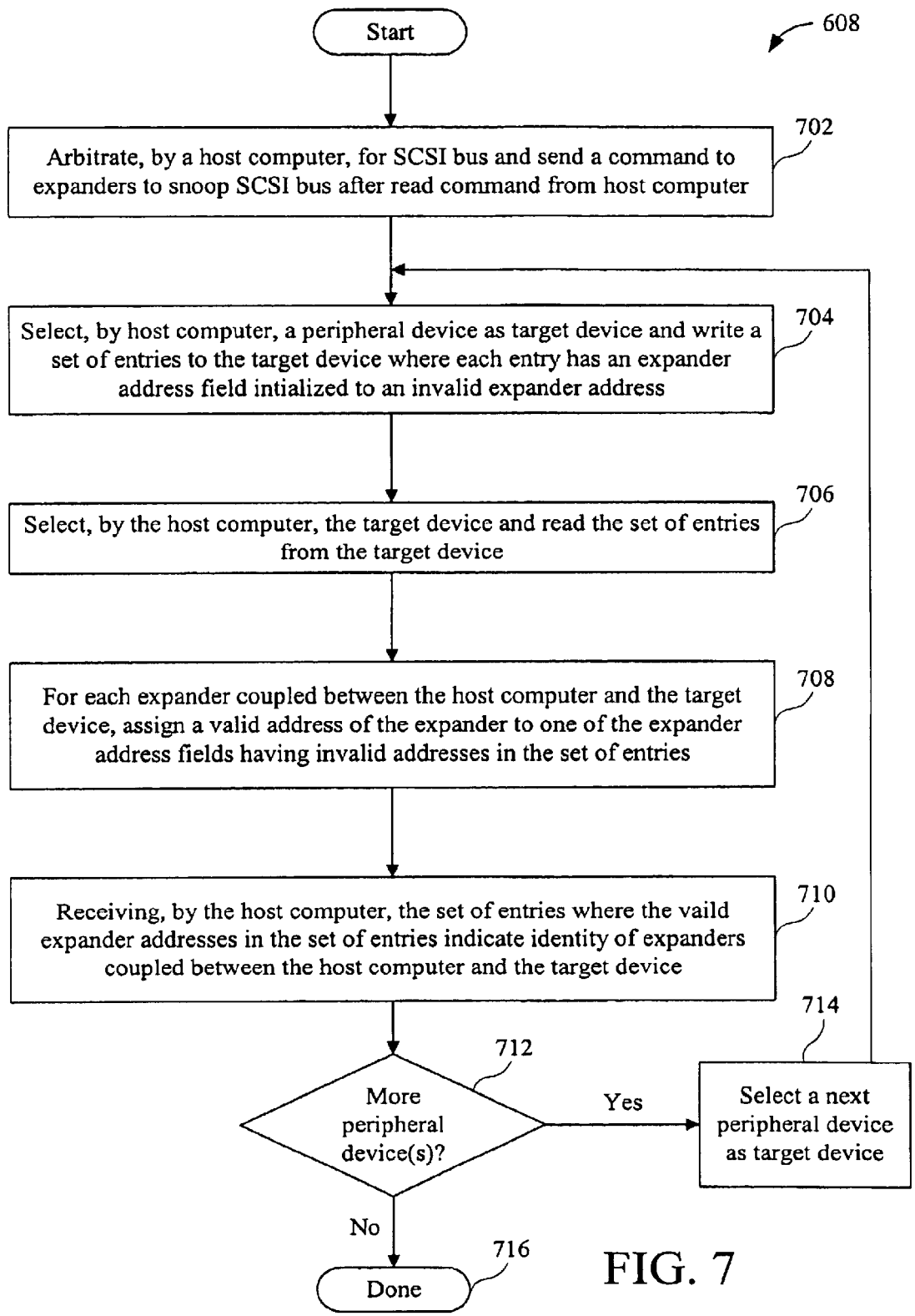
FIG. 7 illustrates a more detailed flowchart of mapping the topology of the I/O subsystem in accordance with one embodiment of the present invention.

FIG. 7 illustrates a more detailed flowchart of the topology mapping operation 608 in accordance with one embodiment of the present invention. In this topology discovery method, the host computer arbitrates for the SCSI bus and notifies expanders to snoop for READ BUFFER commands on the SCSI bus from the host computer in operation 702. In one embodiment, the host computer may issue a broadcast select start topology discovery command (e.g., FAA7h) to all SCSI expanders. This command is broadcast to all expanders and configures the expanders to snoop the SCSI bus upon detecting a READ BUFFER command from the host computer. Optionally, the READ BUFFER data can contain a signature data which the expanders detect. This method, however, may be subject to failure due to the possibility of seeing this signature data during normal READ BUFFER execution.

The host computer then proceeds to select each SCSI device, preferably in the order of the SCSI IDs, sending a write buffer command followed by a read buffer command. Specifically, after the expanders in the I/O subsystem have received the broadcast command, the host computer, in operation 704, selects a SCSI peripheral device as a target and writes a set of entries to the target device over the SCSI bus. Each entry has an expander address field and an expander characteristic field. The expander address field of each entry from the host computer is initialized to an invalid expander address, which is written to the target device. The expander characteristic field is initially written with a specified data pattern that can be modified by individual expanders in the path between the host computer and the target device. The set of entries is stored in an internal read/write buffer of the target device.

It should be appreciated that the present invention may utilize any suitable number of entries up to the maximum number of expanders allowed between the host computer and a peripheral device. For example, the host computer may write eight entries to the target device with one entry for each potential expander. In this setting, a transfer that holds eight entries allows mapping (i.e., discovery) of up to eight in-line expanders between the host computer and the target SCSI device. In this example, each expander entry is 16 bytes or 8 words. However, the size of the expander entry is not limited to such size and may be of any size. The first word of each expander entry is configured to store an expander address. Initially, all eight entries are written with an invalid expander address FF00h in the first WORD (e.g., WORD 0) corresponding to the expander address field and 0000h in the rest from WORD 1 to WORD 7 corresponding to expander characteristics field.

After writing the set of entries to the target device, the host computer selects the target device and reads the set of entries back from the target device in operation 706. For example, the host computer may issue a read buffer command to the target device to read the set of entries stored in the read/write buffer of the target device. In response, the selected target device responds by asserting a REQ signal and placing the set of entries from its read/write buffer on the SCSI bus, preferably in asynchronous and wide mode. The REQ signal indicates a request for an information transfer handshake and is used to latch the SCSI data bus into the initiator's buffer.

As the entries are placed on the SCSI bus, each expander in the path between the target device and the host computer snoops the SCSI bus in operation 708. Specifically, each expander writes its specified expander address, which is a valid expander address, into one of the expander address fields having invalid addresses in the set of entries. For example, each expander in the path of the read buffer command captures the REQ signal and data for the first WORD (i.e., expander address field) of each 16-byte entry from the selected target device. If an entry has a valid expander address in the first WORD (i.e., expander address field), it is passed untouched along with the remaining seven WORDS. On the other hand, if the first WORD corresponding to the expander address field is an invalid expander address (e.g., FF00h), the expander modifies the first detected invalid expander address by replacing the invalid expander address with its valid expander ID including XID and XSIG. In addition, the expander writes its expander characteristics into the next seven words of the entry corresponding to the expander characteristic field.

If an expander detects a valid expander address in the expander address field of the last entry (e.g., eight entry), this means that more than the maximum allowed number of expanders are present in the path between the host computer and the target device. In this case, the expander may modify the expander address field of the eighth entry to a specified value (e.g., FFFFh) indicating to the host computer that more than the maximum allowed in-line expanders are present in the path. If an auto-addressable expander does not have a valid address assigned, it may modify the first detected invalid expander address byte (e.g., FF00h) with a specified value (e.g., 0000h) to signal the un-addressed expander location to the host computer.

In so doing, the expander addresses and characteristics of each expander which is coupled between the host computer and the target device are written into the corresponding fields in the entries, which are then passed to the host computer for storage over the SCSI bus in operation 710. The set of entries received by the host computer thus maps the identity and characteristics of each expander coupled in the path between the host computer and the target device by providing its address and characteristics. In this manner, the host computer discovers the topology of the I/O system between the host computer and the target device.

After discovering I/O system topology between the host computer and the selected target device, the method proceeds to operation 712 where it determines whether one or more SCSI peripheral devices exist in the I/O system. If so, the host computer selects a next SCSI peripheral device with the next SCSI ID as a target device in operation 714. The method then proceeds back to operation 704 to repeat the topology discovery for any expanders coupled between the host computer and the new target device. After the set of entries for all SCSI devices are received, the host computer stores the sets of entries, which essentially define a topology map of the entire I/O subsystem. At this time, the host computer may alert other host computers, if present, of the completion of its topology discovery. The method then terminates in operation 716.

The present invention thus defines the topology of an I/O subsystem by a device map where each possible device ID has a set of up to a maximum allowed number of in-line expanders. For a maximum allowed number of eight in-line expanders, for example, eight expander entries, Which is 128 bytes per target device ID, are used to define the expander path for a total map size of 2048 bytes for 16 possible SCSI devices. The 128 bytes per device ID allows up to 8 in-line expanders to any SCSI device. The first entry in the set defines the expander to which the device is physically attached. The second entry describes the next in-line expander and so on. Also, an expander entry in the set with the first WORD of FF00h, which is an invalid expander address, indicates the end of the set. If there are no expanders in-line to the target device, the first expander entry of the set is FF00h. If there are eight in-line expanders, then there are no FF00h entries, and the termination is assumed after the eighth entry. On the other hand, if there are more than 8 in-line expanders the first word of the eighth entry is FFFFh, and this condition may be treated as an error. In such cases, the host computer may issue a broadcast select stop topology discovery command to notify the expanders to stop snooping read buffer responses on the SCSI bus.

FIG. 8A shows a schematic diagram of an exemplary set of N expander entries from Entry 1 to Entry N in accordance with one embodiment of the present invention. These entries are generated and sent by the host computer to a target SCSI device. Each entry includes an expander address field 802 and an expander characteristic field 804. The expander address field 802 is a single WORD of two bytes (e.g., WORD 0) while the expander characteristic field 804 has seven WORDs from WORD 1 to WORD 7.

Each expander field 802 includes an XID field of one byte width for storing an expander ID and an expander signature field of one byte width for storing an expander signature. When writing the entries to a target device, the host computer initializes the expander address field 802 of all entries to an invalid expander address with a data value of FF00h. In addition, it initializes each byte in the expander characteristic field 804 to a data value of 0000h.

FIGS. 8B to 8G illustrate topology maps for SCSI peripheral devices 432 to 458 in the I/O subsystem 400 shown in FIG. 4 when host computer 402 implements the topology discovery method of FIG. 6 in accordance with one embodiment of the present invention. The N number of entries, which is preferably eight, may be any number to suit SCSI bus protocols implemented in an I/O subsystem. A topology map for the other host computer 404 may be generated in a similar manner.

FIG. 8B shows a list of entries mapping the topology for each of the SCSI devices 442, 444, 446, and 448 in I/O subsystem 400. As seen in the I/O subsystem 400 of FIG. 4, each of the SCSI devices 442, 444, 446, and 448 is connected to the host computer 402 via expander 424. Of the N entries, the first entry, which is Entry 1, specifies, in the expander address field 802, the expander address 80A7h of the expander 424 to which the SCSI devices 442, 444, 446, and 448 are coupled. In addition, the expander characteristic field 804 of Entry 1 specifies the expander characteristics of the expander 424. The expander characteristics, for example, may include various expander information relating to page code, page length, free-running clock with skew management, clocking, reset isolation and control, isolate segments, near-side select, BSY signal state, control signal state, receiver bias cancellation, driver bias cancellation, write precompensation, receiver equalization, etc. Because there is only one in-line expander 424 present between the host computer 402 and the SCSI devices 442, 444, 446, and 448, the other entries from Entry 2 to Entry N are returned to the host computer 402 without modification.

After mapping the topology for SCSI devices 442, 444, 446, and 448, the topology for the next SCSI device 458 with SCSI ID of 4 is mapped. FIG. 8C shows a list of entries mapping the topology for the SCSI device 458 in the I/O subsystem 400. As shown in the I/O subsystem 400, the SCSI device 458 is connected to the host computer 402 via expanders 430, 428, and 422. Accordingly, the first three entries, Entries 1, 2, and 3, specify the expander addresses 81A7h, 82A7h, and 83A7h of expanders 430, 428, and 422, respectively, in the associated expander address fields. In addition, the expander characteristic fields of Entries 1, 2, and 3 specify the expander characteristics of the expanders 430, 428, and 422, respectively. The remaining entries, Entries 4 to Entry N, are returned to the host computer 402 without modification.

FIG. 8D shows a topology map for SCSI device 432 with SCSI ID of 5. As shown in FIG. 4, the SCSI device 432 is directly coupled to the computer 402. Thus, all entries are returned to the host computer 402 with the initial values without modifications.

The next SCSI peripheral device 408, which is the host adapter for the other host computer 404, is attached to the host computer 402 through expanders 430, 428, and 422 in the same path as the SCSI device 458. The topology for the host adapter 408 is thus identical to the entry map shown in FIG. 8C. The next SCSI peripheral device is the host adapter 406 with a SCSI ID of 7 in the host computer 402. Accordingly, topology map discovery need not be performed in this case.

Figures 8E, 8F:
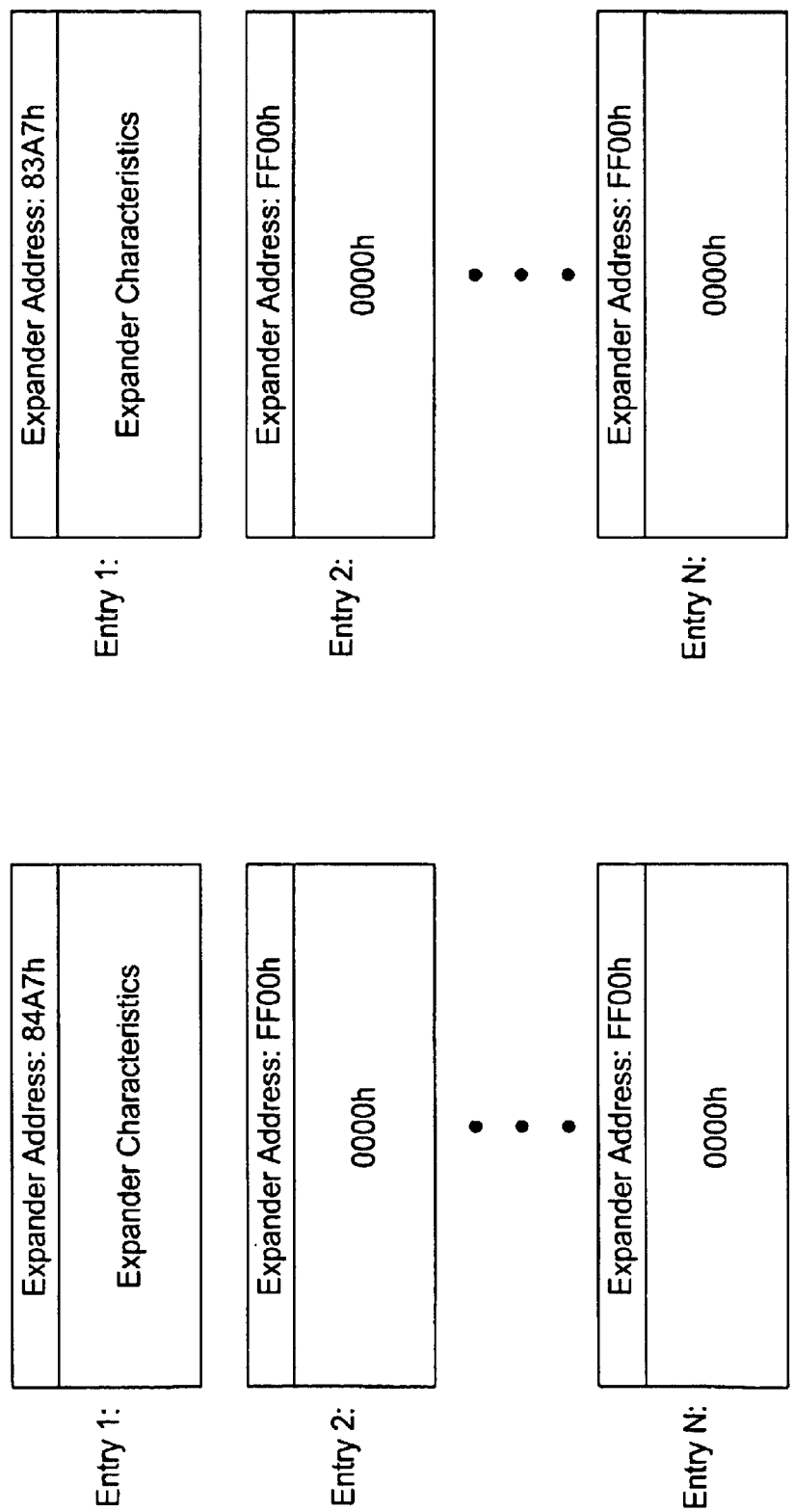

The next SCSI devices 434, 436, 438, and 440 with SCSI IDs of 8, 9, 10, and 11, respectively, are coupled to the host computer 402 via expander 426. FIG. 8E shows a list of entries mapping the topology for each the SCSI devices 434, 436, 438, and 440 in the I/O subsystem 400. The first entry, Entry 1, specifies the expander address 84A7h of the expanders 426 in the associated expander address field. Additionally, the expander characteristic field of Entry 1 contains expander characteristic information of the expander 426. The remaining entries, Entries 2 to Entry N, have been returned to the host computer 402 without modification.

FIG. 8F illustrates a list of entries mapping the topology for each the next SCSI devices 450 and 452 in the I/O subsystem 400. Each of the SCSI devices 450 and 452 with SCSI IDs of 12 and 13, respectively, is coupled to the host computer 402 via expander 422 with an address of 83A7h.

Thus, the first entry, Entry 1, specifies the expander address 83A7h of the expander 422 in the associated expander address field. The expander characteristic field of Entry 1 also contains expander characteristic information of the expander 422. The remaining entries, Entries 2 to Entry N, contain initial values sent from the host computer 402.

Figure 8G:
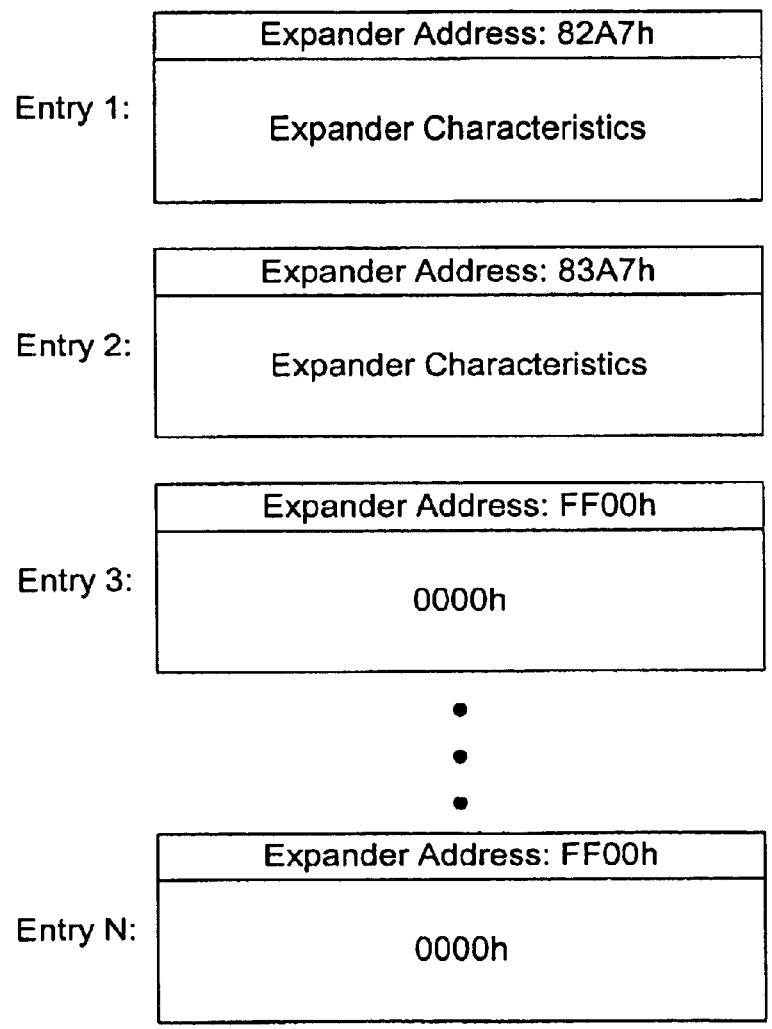

The next SCSI devices 454 and 456 with SCSI IDs of 14 and 15, respectively, are coupled to the host computer 402 via expanders 428 and 422. FIG. 8G illustrates a list of entries that map the topology for each the SCSI devices 454 and 456 in the I/O subsystem 400. The first two entries, Entries 1 and 2, contain the expander addresses 82A7h and 83A7h of expanders 428 and 422, respectively, in the associated expander address fields. Additionally, the expander characteristic fields of Entries 1 and 2 contain the expander characteristics of the expanders 428 and 422, respectively. The remaining entries, Entries 3 to Entry N, contain initial values from the host computer 402.

Thus, the methods of the present invention provide topology mapping of I/O subsystems that use expanders to allow an in-line peripheral bus to run for greater lengths with branches. The I/O topology mapping is useful, for example, in domain validation, where expanders are addressed to determine their capabilities. In addition, the expander addressing scheme of the present invention allows significant flexibility in adding expanders without using conventional one-bit SCSI device IDs. Accordingly, the number of addressable legacy SCSI devices in an I/O subsystem is not reduced by the use of expanders.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for automatically discovering topology map of an I/O subsystem, the I/O subsystem being coupled to one or more host computers and including one or more peripheral buses, a set of peripheral devices, and a set of expanders, each expander having a valid expander address and being arranged to couple a pair of the peripheral buses, the peripheral devices and the one or more host computers being coupled to the peripheral buses, the method comprising:

a) selecting, by a host computer, a peripheral device as a target device and writing a set of entries to the selected target device, each entry written having an expander address field initialized to an invalid expander address for storing an expander address;

b) selecting, by the host computer, the target device and reading the set of entries from the target device;

c) for each expander coupled between the host computer and the target device, writing the valid expander address associated with the each expander to one of the expander address fields in the set of entries that contain invalid expander addresses;

d) receiving, by the host computer, the set of entries such that the set of the valid expander addresses in the set of entries indicates identity of associated expanders coupled between the host computer and the target device; and e) repeating operations a) to d) for each of the other peripheral devices as the target device so as to discover the topology map of the entire I/O subsystem.

2. The method as recited in claim 1, wherein the operation of writing the valid expander address for each expander coupled between the host computer and the target device further comprises:

reading the expander addresses in expander address fields of the set of entries; and determining the one of the expander address fields in the set of entries that contain invalid expander addresses.

3. The method as recited in claim 1, wherein the set of entries are ordered in sequence and wherein the each expander coupled between the host computer and the target device writes the associated valid address to the one of the expander address fields in sequence of the entries.

4. The method as recited in claim 3, wherein one of the expander address fields is a first entry having an invalid expander address in the set of entries.

5. The method as recited in claim 1, wherein each expander stores associated expander characteristics, wherein each of the entries further includes an expander characteristic field, and wherein each expander coupled between the host computer and the target device writes associated expander characteristics into the characteristic field of the associated entry.

6. The method as recited in claim 1, wherein the host computer discovers the address of each expander coupled between the host computer and each peripheral device.

7. The method as recited in claim 1, wherein each of the peripheral buses includes an N-bit data bus and wherein the valid expander addresses are defined by:

partitioning the N-bit data bus into a pair of fields that includes an expander ID field and an expander signature field; and assigning a valid expander address to each of the expanders, each valid expander address including a common expander signature in the expander signature field and an expander ID in the expander ID field, wherein more than two bits are asserted in the unique ID for each of the expanders.

8. The method as recited in claim 7, wherein all the expanders share the common expander signature for identifying the expanders.

9. The method as recited in claim 1, wherein the peripheral buses are SCSI buses and the peripheral devices are SCSI devices.

10. A method for automatically discovering topology map of a SCSI I/O subsystem, the SCSI I/O subsystem being coupled to one or more host computers and including one or more SCSI buses, a set of SCSI devices, and a set of expanders, each expander having a valid expander address and being arranged to couple a pair of the SCSI buses, the SCSI devices and the one or more host computers being coupled to the SCSI buses, the method comprising:

a) selecting, by a host computer, a SCSI device as a target device and writing a set of entries to the selected target device, each entry having an expander address field that is initialized to an invalid expander address for storing an expander address;

b) selecting, by the host computer, the target device and reading the set of entries from the target device;

c) for each expander coupled between the host computer and the target device,
   reading the expander addresses in each of the entries; and
   writing the valid expander address associated with the each expander to one of the expander address fields in the set of entries that contain invalid expander addresses;
d) receiving, by the host computer, the set of entries that contain a set of the valid expander addresses, wherein the set of the valid expander addresses in the set of entries indicates identity of associated expanders coupled between the host computer and the target device; and
e) repeating operations a) to d) for each of the other SCSI devices as the target device such that the sets of entries specify the topology map of the I/O subsystem.

11. The method as recited in claim 10, wherein the set of entries are ordered in sequence and wherein the each expander coupled between the host computer and the target device writes the associated valid address to the one of the expander address fields in sequence of the entries.

12. The method as recited in claim 11, wherein the one of the expander address fields is a first entry having an invalid expander address in the set of entries.

13. The method as recited in claim 12, wherein each expander stores associated expander characteristics, wherein each of the entries further includes an expander characteristic field, and wherein each expander coupled between the host computer and the target device writes associated expander characteristics into the characteristic field of the associated entry.

14. The method as recited in claim 10, wherein the host computer discovers the address of each expander coupled between the host computer and each SCSI device.

15. The method as recited in claim 10, wherein each of the SCSI buses includes an N-bit data bus and wherein the valid expander addresses are defined by:
   partitioning the N-bit data bus into a pair of fields that includes an expander ID field and an expander signature field; and
   assigning a valid expander address to each of the expanders, each valid expander address including a common expander signature in the expander signature field and an expander ID in the expander ID field, wherein more than two bits are asserted in the unique ID for each of the expanders.

16. The method as recited in claim 15, wherein all the expanders share the common expander signature for identifying the expanders.

17. A method for discovering topology map of an I/O subsystem, the I/O subsystem being coupled to one or more host computers and including one or more peripheral buses, a set of peripheral devices, and a set of expanders, each expander having a valid expander address and being arranged to couple a pair of the peripheral buses, the peripheral devices and the one or more host computers being coupled to the peripheral buses, the method comprising:

a) selecting, by a host computer, a peripheral device as a target device and writing a set of invalid expander addresses to the target device;
b) selecting, by the host computer, the target device and reading the set of invalid expander addresses from the target device;
c) for each expander coupled between the host computer and the target device, replacing one of the invalid expander addresses with the valid expander address associated with the each expander;
d) receiving, by the host computer, the set of expander addresses that contain a set of the valid expander addresses, wherein the set of the valid expander addresses indicates identity of associated expanders coupled between the host computer and the target device; and
e) repeating operations a) to d) for each of the other peripheral devices as target devices such that the sets of expander addresses define the topology map of the I/O subsystem.

18. The method as recited in claim 17, wherein the operation of replacing one of the invalid expander addresses with the valid expander address associated with the each expander further comprises:
   reading the expander addresses; and
   determining the one of the expander addresses that contains invalid expander addresses in the set of expander addresses.

19. The method as recited in claim 17, wherein the set of expander addresses are ordered in sequence and wherein the each expander coupled between the host computer and the target device writes the associated valid address to the one of the expander address fields in sequence.

20. The method as recited in claim 17, wherein the one of the expander address fields is a first entry having an invalid expander address in the set of expander addresses.

21. The method as recited in claim 17, wherein the host computer discovers the address of each expander coupled between the host computer and each peripheral device.

22. The method as recited in claim 17, wherein each of the peripheral buses includes an N-bit data bus and wherein the valid expander addresses are defined by:
   partitioning the N-bit data bus into a pair of fields that includes an expander ID field and an expander signature field; and
   assigning an associated valid expander address to each of the expanders, each valid expander address including a common expander signature in the expander signature field and an expander ID in the expander ID field, wherein more than two bits are asserted in the unique ID for each of the expanders.

23. The method as recited in claim 22, wherein all the expanders share the common expander signature for identifying the expanders.

24. The method as recited in claim 17, wherein the peripheral buses are SCSI buses and the peripheral devices are SCSI devices.

* * * * *